(12) United States Patent
Kashitani (10) Patent No.: US 8,957,861 B2
(45) Date of Patent: Feb. 17, 2015

(54) INFORMATION PROCESSING APPARATUS, INFORMATION PROCESSING METHOD, AND TERMINAL APPARATUS FOR SUPERIMPOSING A DISPLAY OF VIRTUAL KEYS UPON AN INPUT UNIT

(75) Inventor: Tatsuki Kashitani, Tokyo (JP)

(73) Assignee: Sony Corporation, Tokyo (JP)

( * ) Notice: Subject to any disclaimer, the term of this patent is extended or adjusted under 35 U.S.C. 154(b) by 290 days.

(21) Appl. No.: 13/396,903

(22) Filed: Feb. 15, 2012

(65) Prior Publication Data

US 2012/0218188 A1  Aug. 30, 2012

(30) Foreign Application Priority Data

Feb. 24, 2011  (JP) ................. 2011-038557

(51) Int. Cl.
| | |
|---|---|
| G06F 3/02 | (2006.01) |
| G09G 5/00 | (2006.01) |
| G06F 3/023 | (2006.01) |
| G07F 19/00 | (2006.01) |
| G07F 7/10 | (2006.01) |
| G06F 3/0488 | (2013.01) |

(52) U.S. Cl.
CPC ............ *G06F 3/023* (2013.01); *G07F 19/2055* (2013.01); *G07F 7/1041* (2013.01); *G06F 3/04886* (2013.01)
USPC ....................................................... 345/168

(58) Field of Classification Search
None
See application file for complete search history.

(56) References Cited

U.S. PATENT DOCUMENTS

| | | | | |
|---|---|---|---|---|
| 7,215,327 | B2 * | 5/2007 | Liu et al. ................ | 345/168 |
| 7,860,204 | B2 * | 12/2010 | Furrer et al. ............ | 375/358 |
| 2003/0174125 | A1 * | 9/2003 | Torunoglu et al. ...... | 345/168 |
| 2005/0145807 | A1 * | 7/2005 | Lapstun et al. ......... | 250/566 |
| 2006/0038833 | A1 * | 2/2006 | Mallinson et al. ...... | 345/633 |
| 2009/0300535 | A1 * | 12/2009 | Skourup et al. ........ | 715/773 |
| 2010/0199232 | A1 * | 8/2010 | Mistry et al. .......... | 715/863 |
| 2011/0018903 | A1 * | 1/2011 | Lapstun et al. ......... | 345/633 |
| 2011/0050593 | A1 * | 3/2011 | Kim et al. ............. | 345/173 |
| 2012/0028659 | A1 * | 2/2012 | Whitney et al. ........ | 455/466 |

FOREIGN PATENT DOCUMENTS

| | | | |
|---|---|---|---|
| JP | 10-240186 | | 9/1998 |
| JP | 2002-32176 | | 1/2002 |
| JP | 2005049996 A | * | 2/2005 |
| KR | 10201000049162 | * | 5/2011 |
| WO | WO 0250762 A1 | * | 6/2002 |
| WO | WO 2011085023 A2 | * | 7/2011 |

OTHER PUBLICATIONS

Reitmayr et al., Scalable Techniques for Collaborative Outdoor Augmented Reality, ISMAR, 2004, publication id TR-1882-02E; Harrison et al., Skinput: Appropriating the Body as asn Input Surface, CHI, Apr. 10-15, 2010, Atlanta, GA, ISBN 978-1-60558-929/10/04.*

* cited by examiner

*Primary Examiner* — Grant Sitta
*Assistant Examiner* — Kirk Hermann
(74) *Attorney, Agent, or Firm* — Sherr & Jiang, PLLC

(57) ABSTRACT

A method is provided for recognizing input operations. The method comprises transmitting virtual key information defining a layout of virtual input keys. The method further comprises determining input position information based on a detected input member. The method also comprises determining a key input by comparing the virtual key information with the input position information.

21 Claims, 9 Drawing Sheets

ACTUAL STATE SEEN BY USER AND THIRD PARTY

VIRTUAL KEY INFORMATION THAT TERMINAL APPARATUS 100 DISPLAYS SUPERIMPOSED ONLY TO USER

ACTUAL STATE VISIBLE ONLY TO USER WHERE VIRTUAL KEY INFORMATION IS SUPERIMPOSED

INFORMATION PROCESSING APPARATUS, INFORMATION PROCESSING METHOD, AND TERMINAL APPARATUS FOR SUPERIMPOSING A DISPLAY OF VIRTUAL KEYS UPON AN INPUT UNIT

BACKGROUND

The present disclosure relates to an information processing apparatus, an information processing method, a program, and a terminal apparatus.

ATMs and security systems used for managing room access and the like conventionally maintain security by having a user input secret information such as a PIN (Personal Identification Number) number or a password known by limited users only.

Various techniques are also used to prevent a drop in security due to spying (prying) during the input of information. For example, according to Japanese Laid-Open Patent Publication No. 2002-032176, the layout of input keys displayed on a touch panel display is randomly rearranged every time to prevent a third party from guessing the secret information from the user's hand movements. Japanese Laid-Open Patent Publication No. H10-240186 limits the viewing angle of a liquid crystal monitor to prevent spying.

SUMMARY

However, with the technology in Publication No. 2002-032176, although a third party cannot know the inputted information from merely spying on the user's hand movements, it is easy for such third party to know the inputted information by looking at the display along with the user's hand movements. Also, although the technology in Publication No. H10-240186 can reduce the frequency of spying, it cannot completely prevent spying from occurring.

Therefore, it is desirable to provide a novel and improved information processing apparatus, information processing method, and terminal apparatus capable of significantly improving security when secret information is inputted.

Accordingly, there is provided an apparatus for recognizing input operations. The apparatus comprises an a communication unit configured to transmit virtual key information. The apparatus further comprises an input unit configured to determine input position information based on a detected input member. The apparatus also comprises a determination unit configured to determine a key input by comparing the virtual key information with the input position information, wherein the virtual key information defines a layout of virtual input keys to be superimposed on the input unit.

In another aspect, there is provided a terminal apparatus for representing virtual key information. The terminal apparatus comprises an imaging unit configured to receive image data representing an input image. The terminal apparatus further comprises a recognition unit configured to recognize an input portion in the image data based on features of the input portion. The terminal apparatus also comprises a display control unit configured to display an image representing virtual key information superimposed on the input portion.

In another aspect, there is provided a method for recognizing input operations. The method comprises transmitting virtual key information defining a layout of virtual input keys. The method further comprises determining input position information based on a detected input member. The method also comprises determining a key input by comparing the virtual key information with the input position information.

In another aspect, there is provided a method for representing virtual key information. The method comprises receiving image data representing an input image. The method further comprises recognizing an input portion in the image data based on features of the input portion. The method also comprises displaying an image representing virtual key information superimposed on the input portion.

In another aspect, there is provided a tangibly-embodied non-transitory computer-readable storage medium storing instructions which, when executed by a processor, cause a computer to perform a method for recognizing input operations. The method comprises transmitting virtual key information defining a layout of virtual input keys. The method further comprises determining input position information based on a detected input member. The method also comprises determining a key input by comparing the virtual key information with the input position information.

In another aspect, there is provided a tangibly-embodied non-transitory computer-readable storage medium storing instructions which, when executed by a processor, cause a computer to perform a method for representing virtual key information. The method comprises receiving image data representing an input image. The method further comprises recognizing an input portion in the image data based on features of the input portion. The method also comprises displaying an image representing virtual key information superimposed on the input portion.

In another aspect, there is provided a system. The system comprises an input apparatus comprising a communication unit configured to transmit virtual key information, an input unit configured to determine input position information based on a detected input member, and a determination unit configured to determine a key input by comparing the virtual key information with the input position information. The system further comprises a terminal apparatus comprising an imaging unit configured to receive image data representing an input image, a recognition unit configured to recognize an input portion in the image data based on features of the input portion, and a display control unit configured to display an image representing virtual key information superimposed on the input portion.

In another aspect, there is provided a system. The system comprises an input apparatus comprising communication means for transmitting virtual key information, input means for determining input position information based on a detected input member, and determination means for determining a key input by comparing the virtual key information with the input position information. The system further comprises a terminal apparatus comprising imaging means for receiving image data representing an input image, recognition means for recognizing an input portion in the image data based on features of the input portion, and display control means for displaying an image representing virtual key information superimposed on the input portion.

According to the embodiments described above, there are provided an information processing apparatus, information processing method, and a terminal apparatus capable of significantly improving security when secret information is inputted.

DETAILED DESCRIPTION OF THE EMBODIMENTS

In the following, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

It is to be noted that the description is set forth below in accordance with the following order.
First Embodiment
  1. System Overview
  2. Example Configuration of Terminal Apparatus
  3. Example Configuration of Input Terminal (Information Processing Apparatus)
  4. Example of Processing Flow
Second Embodiment
  5. System Overview
  6. Example Configuration of Server (Information Processing Apparatus)
  7. Example Configuration of Input Terminal
  8. Example of Processing Flow
Conclusion In recent years, attention has been focused on a technology called AR (Augmented Reality) that presents additional information to users by superimposing such information on the real world. The information presented to the user by AR technology may be visualized using virtual objects of a variety of forms, such as text, icons, and animation. One of the main fields suitable for AR technology is supporting user activities in the real world. A security system in which AR technology is applied is described below. By doing so, it is possible to improve security when secret information, such as a PIN number, a password, or a pass code, is inputted.

It is possible to apply a security system that uses AR technology to a system for improving security, such as an ATM or management of room access. As examples of such a security system, a first embodiment and a second embodiment are described below for ATM (automated teller machine) processing systems in which a user U makes use of an ATM apparatus as an input terminal.

First Embodiment (1. System Overview)

First, an overview of a security system 1 according to a first embodiment will be described with reference to FIG. 1. The security system 1 includes a terminal apparatus 100 and an input terminal 200. The input terminal 200 according to the first embodiment is one example of an "information processing apparatus" for the present disclosure. In the example in FIG. 1, ATM (automatic teller machine) processing is carried out after the user U has made a key input of a desired password using an input unit 240 of the input terminal 200 that is an object in a real space. The input unit 240 is a nondisplayed touch panel display and/or an unmarked keypad, and key input information in accordance with the input operation from the user U is received via the input unit 240.

The user U uses the terminal apparatus 100. The terminal apparatus 100 is connected to an image pickup apparatus 120 and a display apparatus 150 that are mounted on the user U's head. The image pickup apparatus 120 picks up images of a real space in the direction of the line of sight of the user U and outputs a series of input images to the terminal apparatus 100. The display apparatus 150 displays AR images that include virtual key information.

The virtual key information defines the layout of virtual input keys that are displayed superimposed on the input unit 240 appearing in the images. In the first and second embodiments, as shown in the center drawing in FIG. 4, the virtual key information is layout information for keys. However, the virtual key information is not limited to this and may be key layout information showing the layout of QWERTY keys or a tenkey, or may be information showing button positions on the input unit 240 of the input terminal 200. Also, the virtual key information may be a text box in which some kind of text information is written, such as a label, a speech balloon, or a message tag, or may be a drawing or symbol symbolically expressing some kind of information, such as an icon. Note that the virtual key information after deformation to be displayed as an AR image, described later, is also included in the concept of "virtual key information."

Figure 1:
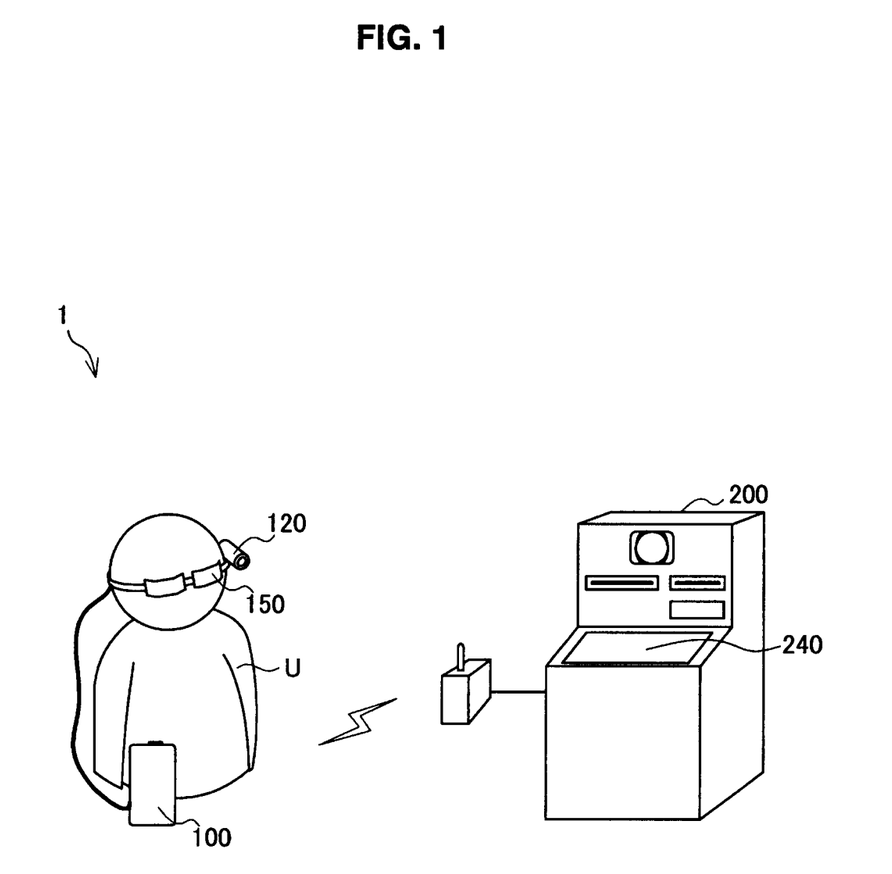
FIG. 1 is a schematic diagram showing an overview of a security system according to a first embodiment of the disclosure.

In the example in FIG. 1, the display apparatus 150 is a head-mounted display (HMD). However, the terminal apparatus 100 is not limited to the example of the camera-equipped head-mounted display shown in FIG. 1 and may be an AR appliance such as a camera-equipped mobile terminal or the like. In the case of a camera-equipped mobile terminal, the camera picks up images of the real space, and after image processing by an MPU or CPU incorporated in the mobile terminal, an image of the virtual key information may be superimposed and displayed on images of the real space on the screen of the terminal. The screen of the display apparatus 150 may be a see-through screen or may be a non see-through screen. Note that for the purposes of this specification, the concept of an image being "picked up" includes a see-through screen transmitting ambient light.

The terminal apparatus 100 may be a PC (Personal Computer) or a game console or another type of apparatus. The terminal apparatus 100 communicates with the input terminal 200 via a communication connection which may be wired or wireless. As examples, the communication between the terminal apparatus 100 and the input terminal 200 may be direct communication according to a P2P (Peer to Peer) method or may be indirect communication carried out via another apparatus (not shown) such as a router or a server. The terminal apparatus 100 displays the virtual key information possessed by the input terminal 200 superimposed on the real space on the display apparatus 150.

The input terminal 200 may be disposed in a branch of a bank, for example, and may be an ATM (automated teller machine) apparatus that carries out ATM processing. The input terminal 200 stores virtual key information.

Specific example configurations of the respective apparatuses in the above security system 1 are described in detail in the following sections.

(2. Example Configuration of Terminal Apparatus)

Figure 2:
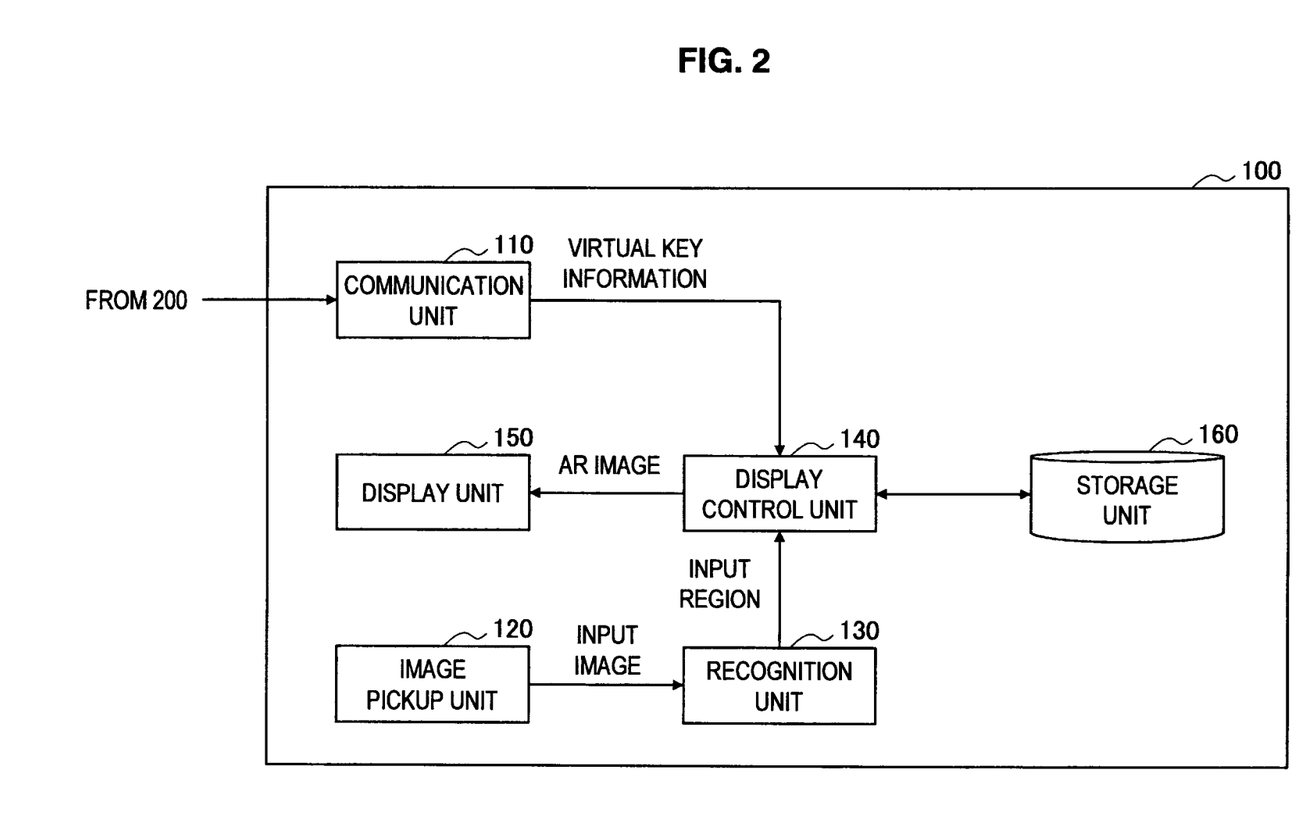
FIG. 2 is a block diagram showing one example of the configuration of a terminal apparatus according to the first embodiment.

First, one example of the internal configuration of the terminal apparatus 100 will be described. FIG. 2 is a block diagram showing one example of the configuration of the terminal apparatus 100 according to the first embodiment. As shown in FIG. 2, the terminal apparatus 100 includes a communication unit 110, an image pickup unit 120 (i.e., an imaging unit), a recognition unit 130, a display control unit 140, a display unit 150, and a storage unit 160. As used herein the term "unit" may be a software module, a hardware module, or a combination of a software module and a hardware module. Such hardware and software modules may be embodied in discrete circuitry, an integrated circuit, or as instructions executed by a processor.

The communication unit 110 is a communication interface that mediates the communication connection between the terminal apparatus 100 and another apparatus. When the terminal apparatus 100 participates in the security system 1, the communication unit 110 establishes a communication connection between the terminal apparatus 100 and the input terminal 200. Although the communication performed by the communication unit 110 may be wired or wireless communication as stated earlier, normally information is exchanged with the input terminal 200 via wireless communication such as a wireless LAN or Bluetooth (registered trademark). By doing so, communication that enables the user U to make use of services of the security system 1 becomes possible. More specifically, the communication unit 110 receives the virtual key information from the input terminal 200.

Figure 4:
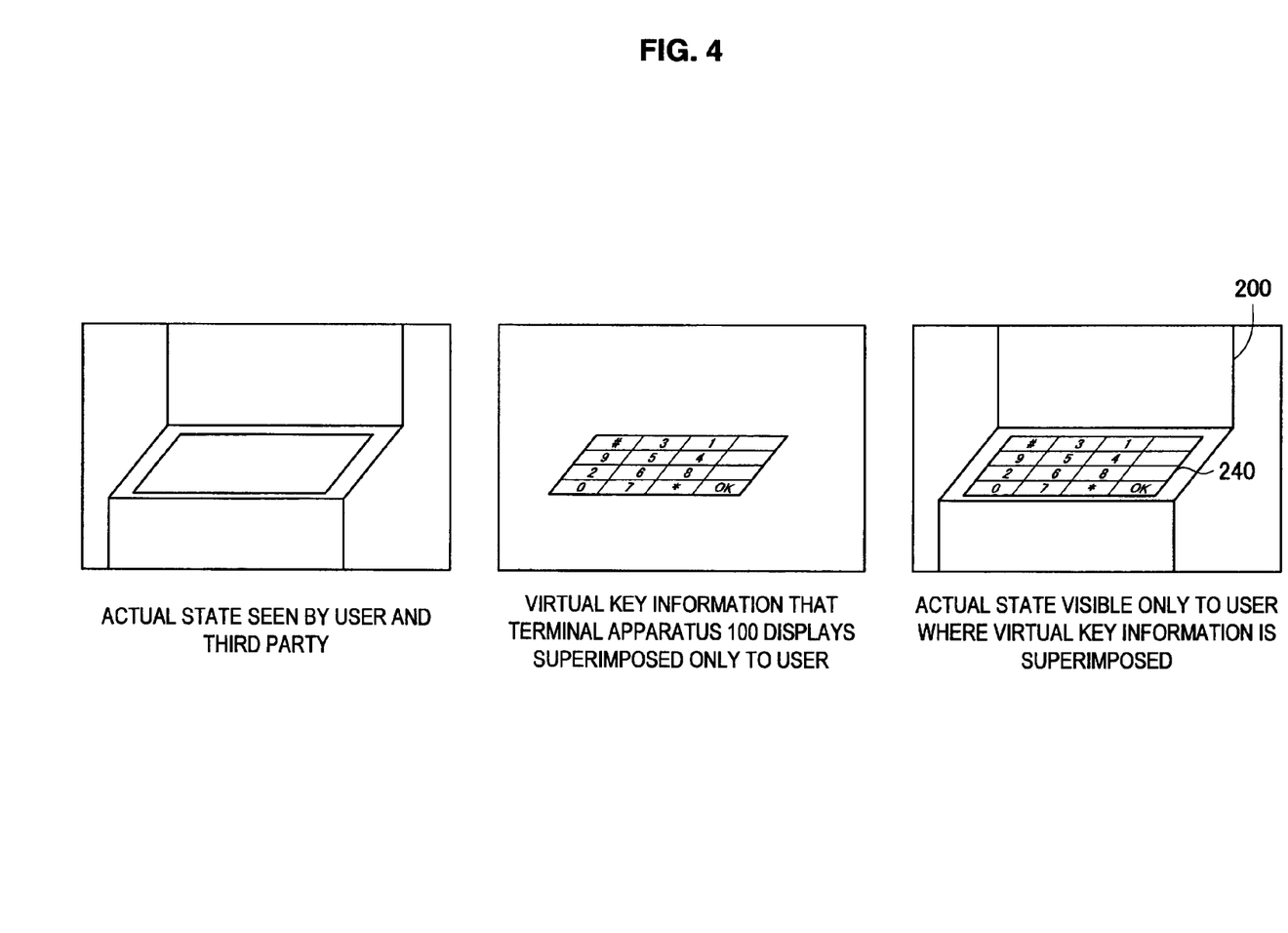
FIG. 4 is a diagram useful in explaining an AR image according to the first embodiment and a second embodiment.

The image pickup unit 120 corresponds to the image pickup apparatus 120 of the terminal apparatus 100 shown in FIG. 1 and acquires a series of input images by picking up images of a real space. The image pickup unit 120 picks up images (video) in the direction of the user U's line of sight. When making use of the ATM services, the user U's line of sight is oriented toward the input terminal 200 to input a password. This means that the image pickup unit 120 will pick up images of the input terminal 200. The image pickup unit 120 outputs the input images to the recognition unit 130. As one example of what is actually seen by the user U, the image of the input terminal 200 shown on the left in FIG. 4 is outputted to the recognition unit 130.

The recognition unit 130 executes an image recognition process on the input images from the image pickup unit 120. More specifically, the recognition unit 130 recognizes the input unit 240 provided on the input terminal 200 that appears in the input images. When the input unit 240 has been recognized, the recognition unit 130 estimates the position, posture (e.g., angle), and deformation of the input unit 240 appearing in the input images. The recognition unit 130 may recognize the input unit 240 using a known image recognition method, such as pattern matching. For example, the recognition unit 130 may recognize the input unit 240 by carrying out pattern matching for a rectangular frame provided in substantially the center of the input terminal 200. Alternatively, the recognition unit 130 may recognize a two-dimensional barcode, a marker image, a Quick Response (QR) code, or the like physically stuck onto the periphery of the input terminal 200 or the input unit 240 in the input images. For example, markers may be provided in advance at the four corners of the rectangular frame of the input unit 240 and by recognizing the marker images in the input image, the recognition unit 130 may recognize the input unit 240. By doing so, it is possible to reduce the load of image processing. Infrared emitting units or the like may be provided at the four corners of the rectangular frame of the input unit 240 and by detecting the light spots emitted from such units, the recognition unit 130 may recognize the input unit 240. The recognition unit 130 outputs the region (input region) of the recognized input unit 240 to the display control unit 140.

As one example, the recognition unit 130 may detect the input unit 240 according to the principles of the SLAM (Simultaneous Localization and Mapping) technology disclosed in "Real-Time Simultaneous Localization and Mapping with a Single Camera" (Proceedings of the 9th IEEE International Conference on Computer Vision Volume 2, 2003, pp. 1403-1410) by Andrew J. Davison.

The display control unit 140 controls the displaying of the virtual key information sent from the input terminal 200. More specifically, in accordance with the result of the image recognition of the input unit 240, the display control unit 140 first deforms the virtual key information image corresponding to the estimated position, posture and deformation of the input unit 240. By doing so, an image of the virtual key information that is suited to superimposing on the real space seen by the user U is generated.

Next, the display control unit 140 superimposes an image of the virtual key information after deformation onto the region of the input unit 240 recognized by the recognition unit 130. By doing so, it is possible to display the virtual key information superimposed on the actual scenery seen the user U. An image of the virtual key information after deformation is shown in the drawing in the center of FIG. 4, while the drawing on the right shows how the virtual key information after deformation appears superimposed on the input unit 240. Note that the display control unit 140 may draw the image of the virtual key information using the SLAM technique mentioned above.

By doing so, the display unit 150 of the head-mounted display HMD worn by the user U displays (projects) virtual input keys superimposed on the actual scenery seen by the user U. By doing so, it is possible for only the user U to see the AR image in FIG. 4 where the virtual key information is superimposed on the real space seen by the user U.

Note the display unit 150 corresponds to the display apparatus 150 of the terminal apparatus 100 shown in FIG. 1. If the screen of the display apparatus 150 is a see-through screen, it is possible to display the AR image shown on the right in FIG. 4 to the eyes of the user U by projecting only the image of the virtual key information onto the display apparatus 150 so as to become superimposed. Meanwhile, if the screen of the display apparatus 150 is a non see-through screen, it is possible to display the AR image shown on the right in FIG. 4 to the eyes of the user U by superimposing the image of the virtual key information on the input images and displaying such superimposed images (AR images) on the display apparatus 150.

The storage unit 160 stores programs and various data for processing and execution by a processor of the terminal apparatus 100 using a tangibly embodied non-transitory computer-readable storage medium such as a hard disk drive or a semiconductor memory. The storage unit 160 stores also the virtual key information and the like acquired via the communication unit 110 from the input terminal 200.

(3. Example Configuration of Input Terminal (Information Processing Apparatus))

Figure 3:
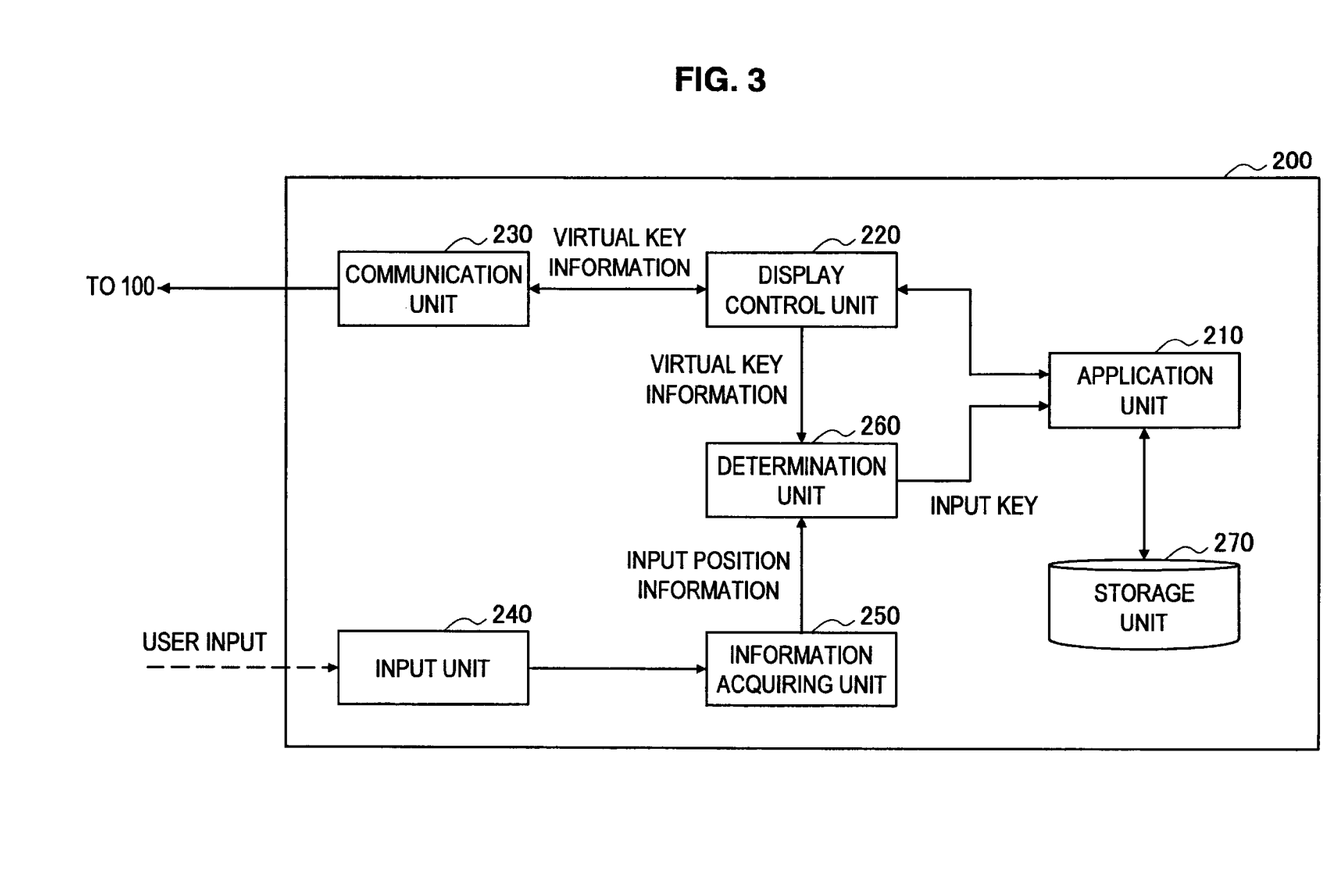
FIG. 3 is a block diagram showing one example of the configuration of an input terminal according to the first embodiment.

Next, one example of the internal configuration of the input terminal 200 will be described. FIG. 3 is a block diagram showing one example of the configuration of the input terminal 200 according to the first embodiment. As shown in FIG. 3, the input terminal 200 includes an application unit 210, a display control unit 220, a communication unit 230, an input unit 240, an information acquiring unit 250, a determination unit 260, and a storage unit 270.

The application unit 210 provides the user with application functions relating to ATM services. The application unit 210 also acts in concert with the display control unit 220 and the determination unit 260 to realize a highly secret user interface (UI) that uses an AR technique.

The display control unit 220 controls the displaying of AR images by the terminal apparatus 100. The display control unit 220 generates the virtual key information described above that visually shows the user U what kind of operations key presses and touch positions by the user U will be interpreted as.

The communication unit 230 is a communication interface that mediates the communication connection between the input terminal 200 and the terminal apparatus 100. The communication unit 230 establishes a communication connection with the terminal apparatus 100. The communication unit 230 transmits the virtual key information to the terminal apparatus 100.

The input unit 240 is used by the user U of the terminal apparatus 100 to input a password for authentication. As examples, the input unit 240 may include a keypad, buttons, switches, or a touch panel. A nondisplayed touch panel display or an unmarked keypad can be given as examples of the input unit 240. In this way, the input unit 240 neither displays markings showing the layout of virtual input keys to the user nor has physical markings showing the same. The input unit 240 detects a physical input position (for example, XY coordinates) from a detected input member (e.g., a finger of a user) or from an input operation (press or touch) on the display made by the user U viewing the AR images and outputs the physical input position to the information acquiring unit 250.

The information acquiring unit 250 generates input position information in accordance with the detection result of the input unit 240 and outputs to the determination unit 260. Note that the physical input position detected by the input unit 240 is also one example of "input position information." In accordance with the detection result of the input unit 240, the information acquiring unit 250 may output the physical input position as it is to the determination unit 260 as the input position information.

By comparing the virtual key information generated by the display control unit 220 and the input position information generated by the information acquiring unit 250, the determination unit 260 determines input information corresponding to the operation by the user U. The determination unit 260 outputs the input information (input key) that is the determination result to the application unit 210.

The storage unit 270 uses a tangibly embodied non-transitory computer-readable storage medium such as a hard disk drive or a semiconductor memory and stores programs and data for processing and execution by a processor of the input terminal 200. The storage unit 270 also stores the virtual key information.

(4. Example of Processing Flow)

Next, the flow of processing in the security system 1 according to the first embodiment will be described with reference to the flowchart in FIG. 5.

First, the display control unit 220 of the input terminal 200 generates the virtual key information and the communication unit 230 transmits the virtual key information to the terminal apparatus 100 (step S102).

The communication unit 110 of the terminal apparatus 100 acquires the virtual key information from the input terminal 200 (step S104). Meanwhile, the image pickup unit 120 of the terminal apparatus 100 picks up images of the real space in the direction of the user U's line of sight and the recognition unit 130 recognizes the region of the input unit 240 from the input images (step S106).

Next, the display control unit 140 of the terminal apparatus 100 generates AR images in which the virtual key information is superimposed on the region of the input unit 240 (step S108). The display unit 150 displays the generated AR images on the display screen of the head-mounted display HMD (step S110).

By doing so, only the user U of the terminal apparatus 100 can see the AR image shown on the right in FIG. 4. This means that even if the input unit 240 of the input terminal 200 is a nondisplayed touch panel display or an unmarked key pad, by touching an arbitrary position on the input unit 240 based on the virtual key information in the displayed AR images, the user U is capable of performing a required key input operation for a password or the like.

When an arbitrary position on the input unit 240 is touched by the user U such as by an input member, the input unit 240 of the input terminal 200 detects the touch position (physical input position) (step S112). The information acquiring unit 250 of the input terminal 200 generates input position information in accordance with the detection result of the input unit 240 (step S114). By comparing the virtual key information generated by the display control unit 220 and the input position information generated by the information acquiring unit 250, the determination unit 260 of the input terminal 200 determines the input information (input key) corresponding to the operation by the user U (step S116), and may execute the operation corresponding to the determined key input.

As described above, with the security system 1 according to the first embodiment, only the user U can see the virtual key information that is visualized and displayed superimposed on the input unit 240 present in a real space using an AR technique. By doing so, the user U can input a password or the like using the unmarked keypad or nondisplayed touch panel in exactly the same way as when operating a keypad or a touch panel on which a key layout is displayed. Meanwhile, since a third party can only see the movements the user U makes in operating the unmarked keypad or nondisplayed touch panel, spying on the input information is prevented. By doing so, with the security system 1 according to the first embodiment, by using an AR technique, it is possible to increase security when inputting secret information such as a PIN number, a password, or a pass code.

Alternatively, input unit 240 may display identifying characters, such as markings of keys, or outlines of keys as part of a touch panel, and may selectively remove display of any identifying characters when input terminal 200 requires input of secret information, such as a PIN number, a password, or a pass code, such that a third party can only see the movements the user U makes when inputting secret information.

Second Embodiment (5. System Overview)

Next, an overview of a security system 2 according to the second embodiment will be described with reference to FIG. 6. The security system 2 according to the second embodiment differs to the security system 1 according to the first embodiment in that a server 300 intermediates between the terminal apparatus 100 and an input terminal 400. Accordingly, the security system 2 according to the second embodiment will be described focusing on this difference.

Figure 6:
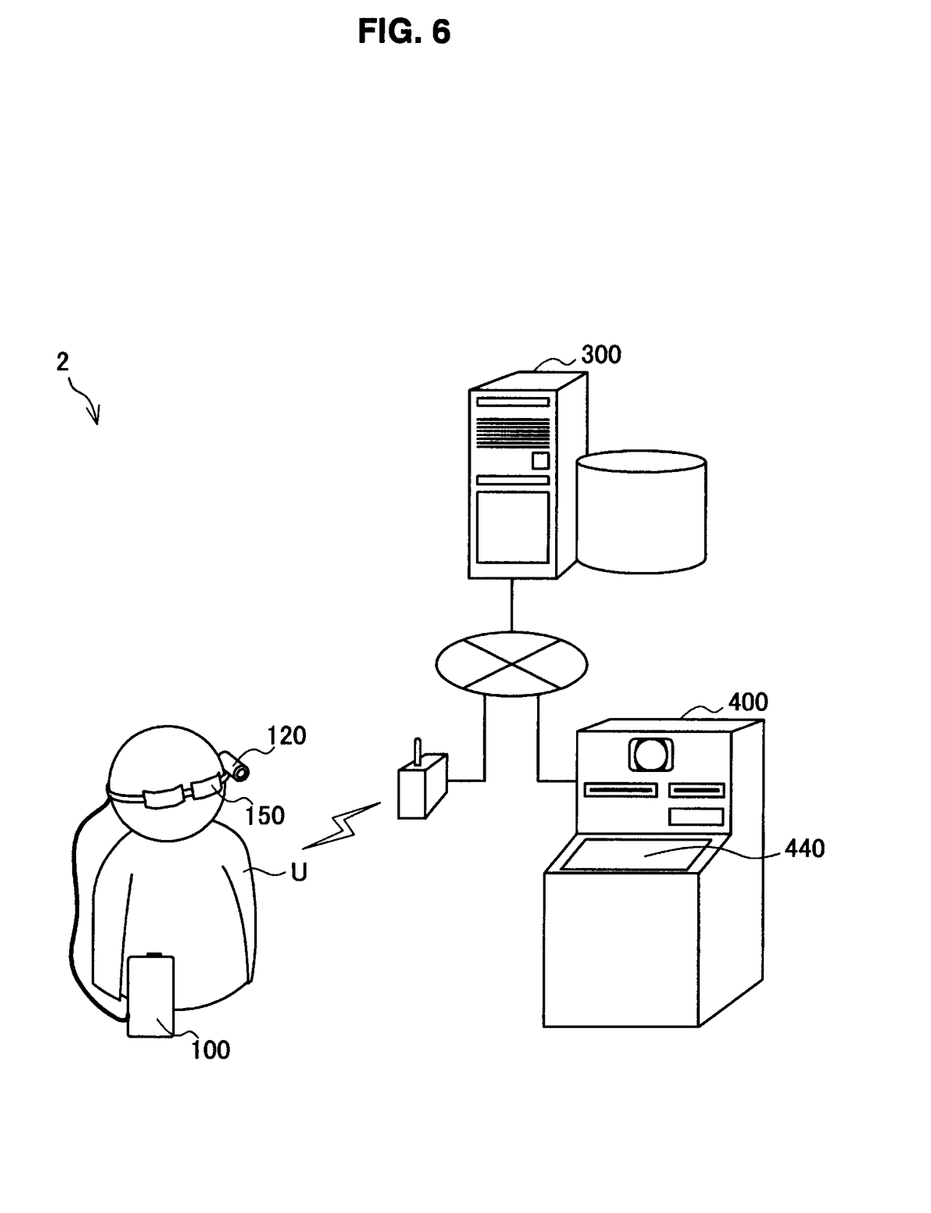
FIG. 6 is a schematic diagram showing an overview of a security system according to the second embodiment.

The security system 2 shown in FIG. 6 includes the terminal apparatus 100, the server 300, and the input terminal 400. Since the configuration of the terminal apparatus 100 according to the second embodiment is the same as that of the terminal apparatus 100 according to the first embodiment, description thereof is omitted here.

(6. Example Configuration of Server (Information Processing Apparatus))

This second embodiment is configured with the application function, display control function, and determination function that were provided in the input terminal 200 according to the first embodiment moved to the server 300. Note that although the input terminal 200 functions as an information processing apparatus in the first embodiment, in the second embodiment, it is the server 300 that functions as an information processing apparatus.

Figure 7:
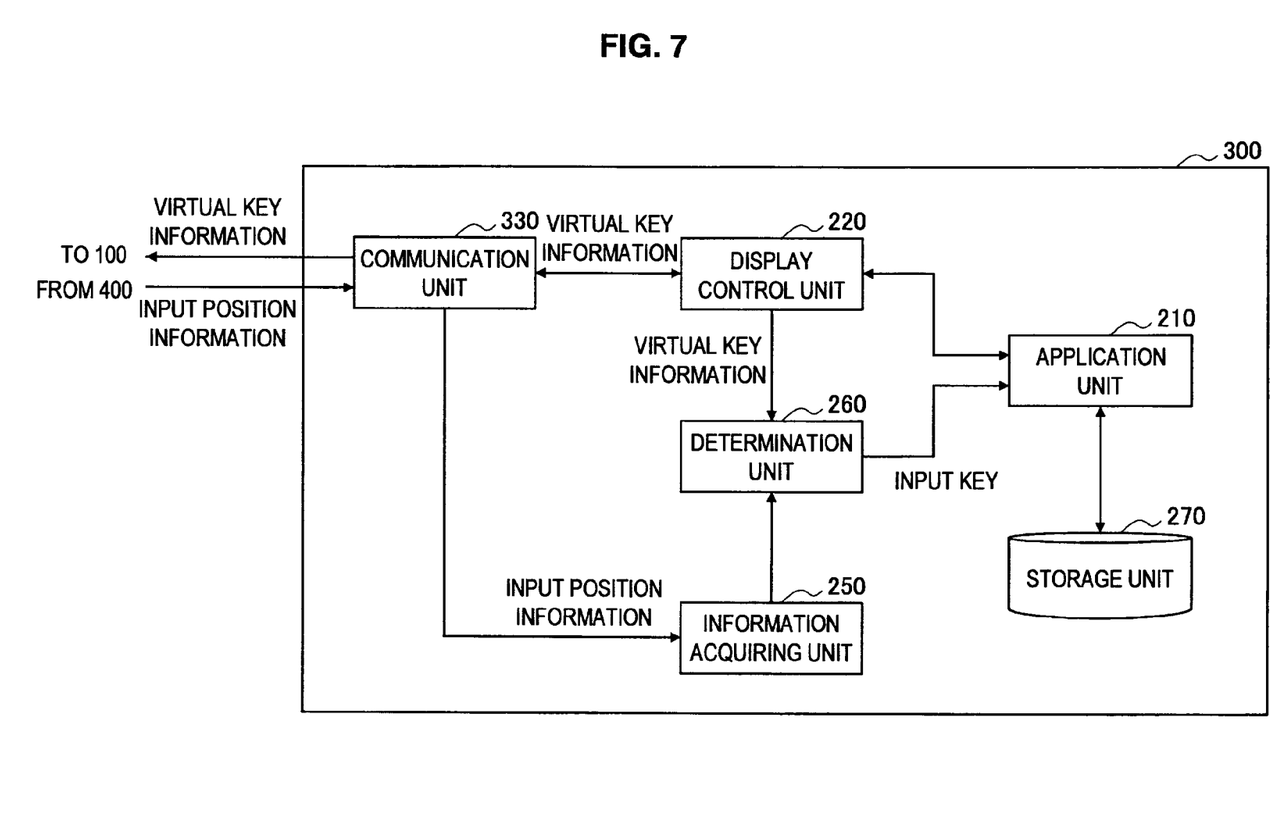
FIG. 7 is a block diagram showing one example of the configuration of a server according to the second embodiment.

FIG. 7 shows the internal configuration of the server 300 according to the second embodiment. The server 300 includes the application unit 210, the display control unit 220, the information acquiring unit 250, the determination unit 260, the storage unit 270, and a communication unit 330. The communication unit 330 transmits the virtual key information generated by the display control unit 220 to the terminal apparatus 100. The communication unit 330 also receives input position information from the input terminal 400.

Since the other component elements of the server 300 are the same as the respective elements of the input terminal 200 according to the first embodiment, description thereof is omitted here. However, the input unit 240 that was provided in the input terminal 200 according to the first embodiment is not present in the server 300.

(7. Example Configuration of Input Terminal)

Figure 8:
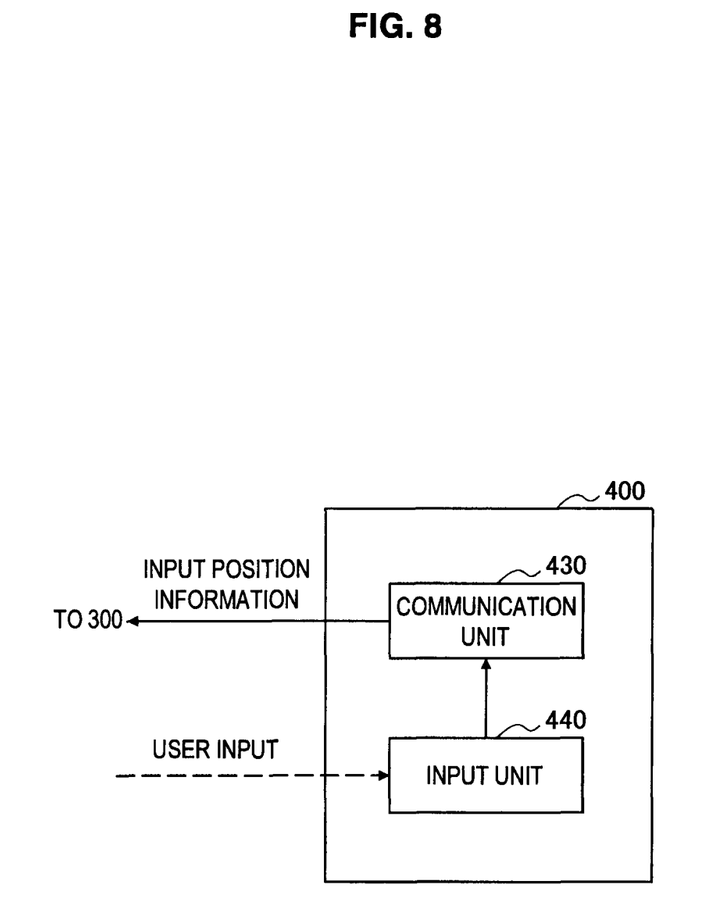
FIG. 8 is a block diagram showing one example of the configuration of an input terminal according to the second embodiment.

FIG. 8 shows the internal configuration of the input terminal 400 according to the second embodiment. The input terminal 400 includes a communication unit 430 and an input unit 440. The input unit 440 has substantially the same functions as the input unit 240 according to the first embodiment, detects a physical input position, and outputs to the communication unit 430. The communication unit 430 transmits the physical input position (input position information) detected by the input unit 440 to the server 300.

(8. Example of Processing Flow)

Figure 9:
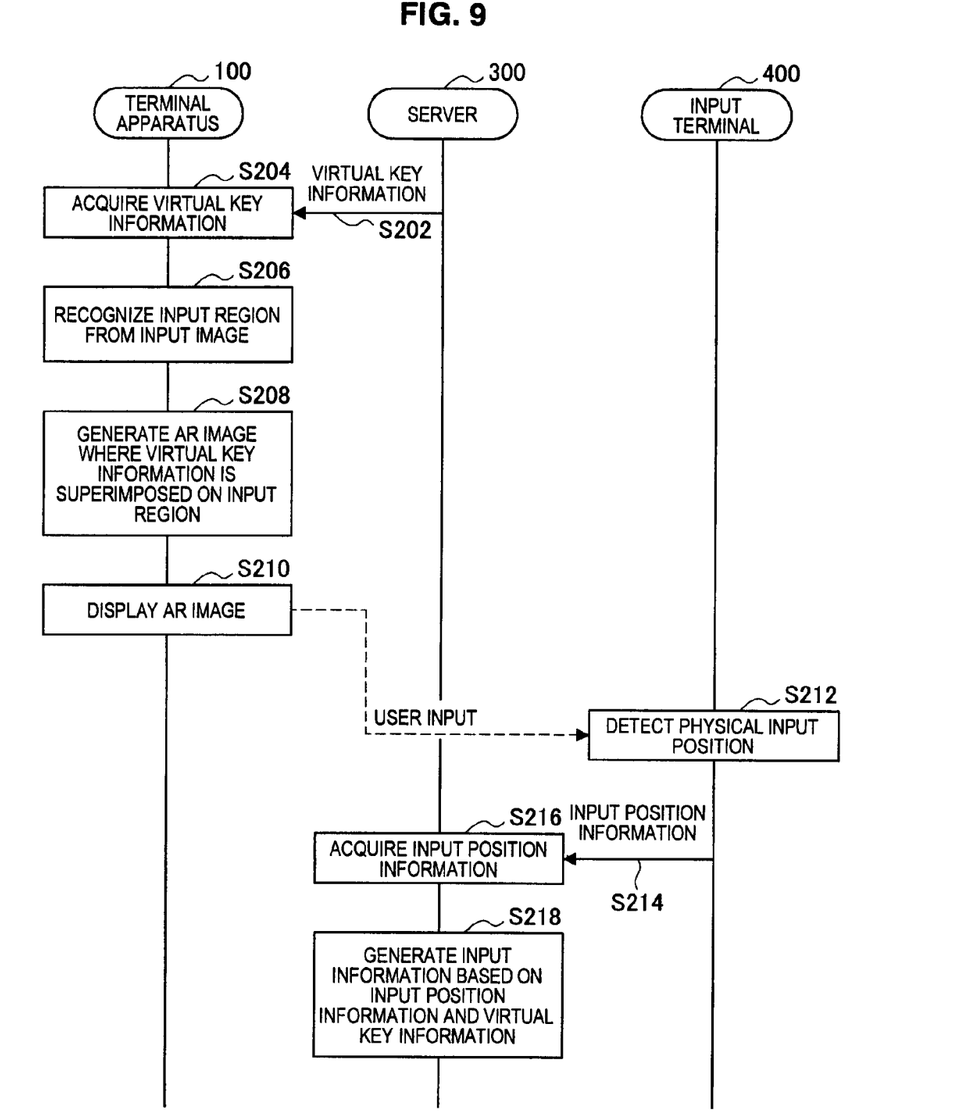
FIG. 9 is a flowchart executed by the security system according to the second embodiment.

Next, the flow of processing in the security system 2 according to the second embodiment will be described with reference to the flowchart in FIG. 9.

First, the display control unit 220 of the server 300 generates the virtual key information and the communication unit 330 transmits the generated virtual key information to the terminal apparatus 100 (step S202).

Figure 5:
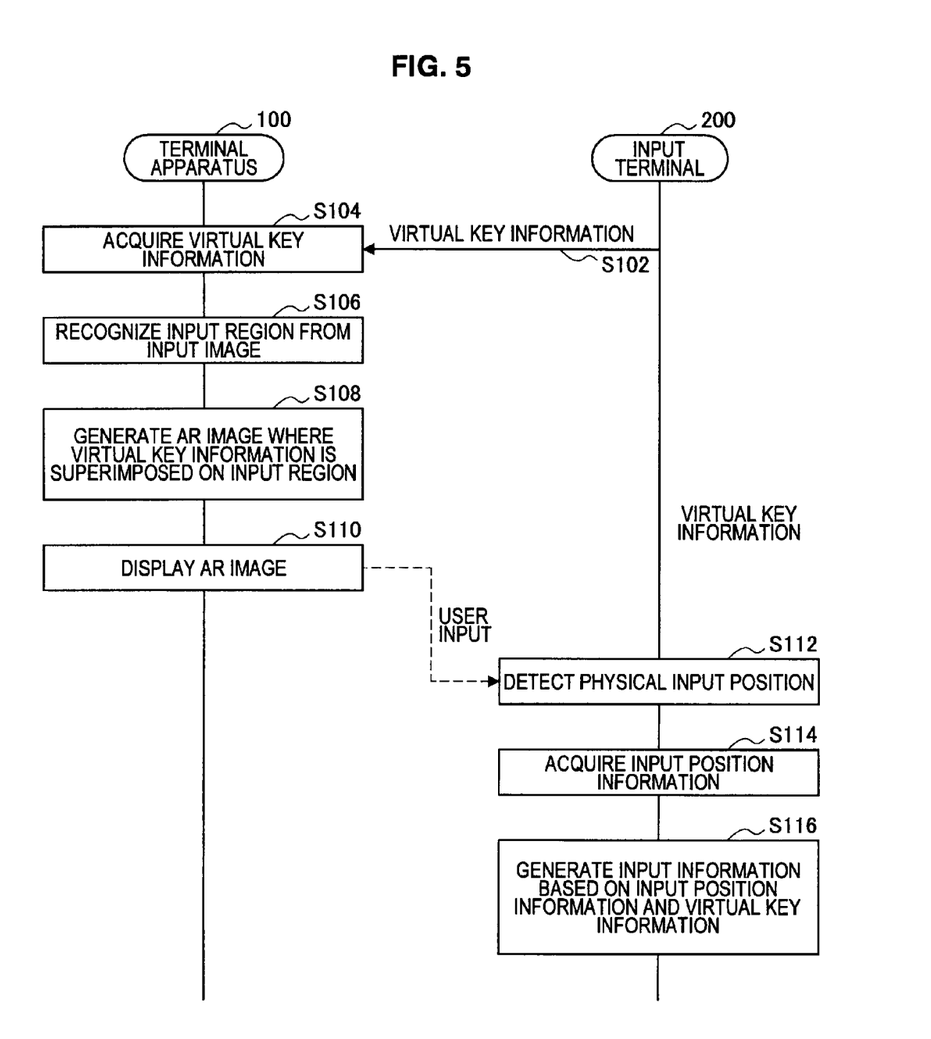
FIG. 5 is a flowchart executed by the security system according to the first embodiment.

Since the steps S204, S206, S208, and S210 executed by the terminal apparatus 100 are the same as the steps S104, S106, S108, and S110 in FIG. 5 executed by the terminal apparatus 100 in the first embodiment, description thereof is omitted here. By operating in this way, only the user U of the terminal apparatus 100 can see the AR image shown on the right in FIG. 4. This means that even if the input unit 440 of the input terminal 400 is a nondisplayed touch panel display or an unmarked key pad, by touching an arbitrary position on the input unit 440 based on the virtual key information in the displayed AR images, the user U is capable of performing a required key input operation for a password or the like.

When an arbitrary position on the input unit 440 is touched by the user U, the input unit 440 of the input terminal 400 detects the touch position (a physical input position) (step S212). The communication unit 430 of the input terminal 400 transmits the physical input information (input position information) that is the detection result of the input unit 440 to the server 300 (step S214). The communication unit 330 of the server 300 receives such information and outputs to the information acquiring unit 250. The information acquiring unit 250 of the server 300 generates input position information from the physical input position (step S216). By comparing the virtual key information generated by the display control unit 220 and the input position information generated by the information acquiring unit 250, the determination unit 260 determines the input information (input key) corresponding to the operation by the user U (step S218).

As described above, with the security system 2 according to the second embodiment, only the user U can see the virtual key information that is visualized and displayed superimposed on the input unit 240 present in a real space using an AR technique. By doing so, it is possible to input a password or the like using the unmarked keypad or nondisplayed touch panel in exactly the same way as when operating a keypad or a touch panel on which a key layout is displayed and spying on the input information by a third party is prevented.

In addition, with the system configuration according to the second embodiment, the virtual key information is transmitted from the server 300 to the terminal apparatus 100 and the input position information is transmitted from the input terminal 400 to the terminal apparatus 100. In this way, according to the second embodiment, the virtual key information and the input position information are transmitted separately. This means that the secret information cannot be guessed even if one of such information is intercepted. By doing so, it is possible to significantly increase security when inputting secret information.

Note that with the security system 2 according to the second embodiment, although the application unit 210 (see FIG. 7) is disposed at the server 300 and all of the applications are executed at the server 300, the present disclosure is not limited to this. For example, only a password authentication process may be executed at the server 300 and an application after password authentication may be executed at the input terminal 400. In this case, the information transmitted from the server 300 to the input terminal 400 may be only the password authentication result and it is not necessary to transmit the password itself. By doing so, it is possible to increase secrecy. As one example, the following describes an example application for a ticket terminal installed at a cinema. In this example, first, when the user inputs the PIN number of his/her credit card into the ticket terminal, an AR secure authentication service provided by a server of the credit card issuer is used. The ticket terminal referred to here is one example of the input terminal 400 according to the present embodiment and the server of the credit card issuer is one example of the server 300 according to the present embodiment. A processing flow may be used where the password authentication process is executed at the server of the credit card issuer and if the authentication succeeds, the ticket terminal is notified of such result and an application after password authentication is executed at the ticket terminal.

CONCLUSION

A first and second embodiment according to the present disclosure have been described with reference to FIGS. 1 to 9. Although the terminal apparatus 100 is held or carried by the user U according to the embodiments described above, the present disclosure is not limited to this. For example, instead of being held or the like by the user U, the terminal apparatus 100 may be fixed in front of an input terminal.

Also, the "AR appliance" for the present disclosure is not limited to the appliances disclosed in the first and second embodiments. For a user equipped with an AR appliance, it is possible to input highly secret information safely using the same method as a conventional terminal operation.

Also, although the virtual key information is transmitted from the input terminal 200 to the terminal apparatus 100 (step S102 in FIG. 5) or from the server 300 to the terminal apparatus 100 (step S202 in FIG. 9) in the embodiments described above, the present disclosure is not limited to this. For example, if the virtual key information is used for displaying a tenkey with a comparatively simple configuration, the virtual key information may be transmitted from the terminal apparatus 100 to the input terminal 200, or from the terminal apparatus 100 to the server 300, or via remote devices or servers in, for example, a cloud computing configuration. By doing so, the virtual key information can be shared by the side that generates the AR display and the side that interprets the input operation, which makes it possible to safely input highly secret information. For example, for the tenkey described above, it is possible to use a configuration where a layout that the user is accustomed to using is stored in advance in the terminal apparatus 100 and such layout is used every time. However, for a complex application and not the comparatively simple application described here, in many cases it will be preferable to send and receive virtual key information according to the flow described in the above embodiments.

Also, security may be maintained on the communication path that connects the apparatuses shown in the embodiments described above using SSL (Secure Socket Layer) or the like so that data such as passwords can be transmitted and received securely.

The series of control processes carried out by the respective apparatuses described in the present specification may be realized using hardware, software, or a combination of hardware and software. Programs that construct such software may be stored in advance on a tangibly embodied non-transitory computer-readable storage medium provided inside or outside the respective apparatuses, for example. During execution, as one example the respective programs may be written into RAM (Random Access Memory) and executed by a processor such as a CPU (Central Processing Unit).

Although embodiments of the present disclosure have been described in detail with reference to the attached drawings, the present disclosure is not limited to the above examples. It should be understood by those skilled in the art that various modifications, combinations, sub-combinations and alterations may occur depending on design requirements and other factors insofar as they are within the scope of the appended claims or the equivalents thereof. Also, any reference in the claims to articles, such as "a" or "an," is to be construed as meaning "one or more."

For example, the present technology can adopt the following configurations.

(1) An information processing apparatus comprising:
a communication unit transmitting virtual key information, which defines a layout of virtual input keys to be displayed superimposed on an input unit appearing in a picked up image, to a terminal apparatus that picks up the image and displays the virtual input keys;
an information acquiring unit acquiring input position information expressing a physical position of a user input detected by the input unit; and
a determining unit determining an input key indicated by a user by comparing the virtual key information transmitted by the communication unit and the input position information acquired by the information acquiring unit.

(2) The information processing apparatus according to the (1),
wherein the communication unit receives the input position information from an input terminal including the input unit detecting the physical position of the user input.

(3) The information processing apparatus according to the (1) or (2),
wherein the information processing apparatus further comprises the input unit detecting the physical position of the user input.

(4) The information processing apparatus according to the (3), wherein the input unit does not display markings showing the layout of the virtual input keys to the user and also does not have physical markings showing the layout.

(5) The information processing apparatus according to any one of the (1) to (4),
wherein the terminal apparatus includes a head-mounted display displaying the virtual input keys superimposed on the input unit.

(6) An information processing method comprising:
transmitting virtual key information, which defines a layout of virtual input keys to be displayed superimposed on an input unit appearing in a picked up image, to a terminal apparatus that picks up the image and displays the virtual input keys;
acquiring input position information expressing a physical position of a user input detected by the input unit; and
determining an input key indicated by a user by comparing the transmitted virtual key information and the acquired input position information.

(7) A program causing a computer to execute processing comprising:
a process transmitting virtual key information, which defines a layout of virtual input keys to be displayed superimposed on an input unit appearing in a picked up image, to a terminal apparatus that picks up the image and displays the virtual input keys;
a process acquiring input position information expressing a physical position of a user input detected by the input unit; and
a process determining an input key indicated by a user by comparing the transmitted virtual key information and the acquired input position information.

(8) A terminal apparatus comprising:
an image pickup unit picking up an image;
a communication unit receiving virtual key information which defines a layout of virtual input keys to be displayed superimposed on an input unit of an input terminal appearing in the image;
a recognition unit recognizing a region corresponding to the input unit in the image; and
a display control unit using the virtual key information received by the communication unit to display the virtual input keys superimposed on the region recognized by the recognition unit.

(9) The terminal apparatus according to the (8),
wherein the display control unit displays the virtual input keys on a head-mounted display.

The present disclosure contains subject matter related to that disclosed in Japanese Priority Patent Application JP 2011-038557 filed in the Japan Patent Office on Feb. 24, 2011, the entire content of which is hereby incorporated by reference.

What is claimed is:

1. An apparatus comprising:
a communication unit configured to transmit virtual key information;
an input unit configured to determine input position information based on a detected input member; and
a determination unit configured to determine a key input by comparing the virtual key information with the input position information;
wherein the virtual key information defines a layout of virtual input keys to be superimposed on the input unit such that each one of the virtual input keys is mapped to be displayed in conjunction with a respective one of a plurality of input positions of the input unit each corresponding to a unique key input,
wherein the mapping of the superimposed displaying of the virtual input keys upon the plurality of input positions is not visible to other persons who are not a current user of the apparatus,
wherein the input unit comprises one of an unlabeled keyboard, or a touch panel display which does not display identifying characters, and
wherein the communication unit, the input unit, and the determination unit are each implemented via at least one processor.

2. The apparatus of claim 1, comprising a processing unit configured to execute the determined key input, wherein the processing unit is implemented via at least one processor.

3. The apparatus of claim 1, comprising a display control unit configured to generate the virtual key information, wherein the display control unit is implemented via at least one processor.

4. The apparatus of claim 1, wherein the virtual key information defines a QWERTY layout.

5. The apparatus of claim 1, wherein the virtual key information comprises at least one of a label, a speech balloon, a message tag, a drawing, or a symbol.

6. An apparatus comprising:
a communication unit configured to transmit virtual key information;
an input unit configured to determine input position information based on a detected input member; and
a determination unit configured to determine a key input by comparing the virtual key information with the input position information;
wherein the virtual key information defines a layout of virtual input keys to be superimposed on the input unit such that each one of the virtual input keys is mapped to be displayed in conjunction with a respective one of a plurality of input positions of the input unit each corresponding to a unique key input,
wherein the mapping of the superimposed displaying of the virtual input keys upon the plurality of input positions is not visible to other persons who are not a current user of the apparatus,
wherein the input unit selectively removes display of identifying characters when secret information is received using the input unit, and
wherein the communication unit, the input unit, and the determination unit are each implemented via at least one processor.

7. The apparatus of claim 1, wherein the input unit comprises at least one of a two-dimensional barcode, a marker image, a Quick Response (QR) code, or an infrared emitting unit, for defining the location of the input unit.

8. A terminal apparatus comprising:
an imaging unit configured to receive image data representing an input image;
a recognition unit configured to recognize an input portion in the image data based on features of the input portion;
a display control unit configured to display an image representing virtual key information superimposed on the input portion such that each one of a plurality of virtual input keys is mapped to be displayed in conjunction with a respective one of a plurality of input positions of the input portion each corresponding to a unique key input; and
a head-mounted display via which the image representing virtual key information is displayed to be superimposed on the input portion,
wherein the mapping of the superimposed displaying of the virtual input keys upon the plurality of input positions is not visible to other persons who are not a current user of the terminal apparatus, and
wherein the imaging unit, the recognition unit, and the display control unit are each implemented via at least one processor.

9. The terminal apparatus of claim 8, comprising a communication unit configured to receive the virtual key information, wherein the communication unit is implemented via at least one processor.

10. The terminal apparatus of claim 8, wherein the recognition unit is configured to recognize at least one of a two-dimensional barcode, a marker image, a Quick Response (QR) code, or an infrared emitting unit, defining the location of the input portion.

11. The terminal apparatus of claim 8, wherein:
the recognition unit is configured to calculate the position and angle of the input portion; and
the display control unit is configured to superimpose on the input portion by transforming the received virtual key information according to the position and angle.

12. A method comprising:
transmitting virtual key information defining a layout of virtual input keys;
determining input position information based on a detected input member; and
determining a key input by comparing the virtual key information with the input position information,
wherein the virtual key information defines a layout of virtual input keys to be superimposed on an input unit such that each one of the virtual input keys is mapped to be displayed in conjunction with a respective one of a plurality of input positions of the input unit each corresponding to a unique key input,
wherein the mapping of the superimposed displaying of the virtual input keys upon the plurality of input positions is not visible to other persons who are not a current user of the input unit, and
wherein the input unit comprises one of an unlabeled keyboard, or a touch panel display which does not display identifying characters.

13. A method comprising:
receiving image data representing an input image;
recognizing an input portion in the image data based on features of the input portion; and
displaying, via a head-mounted display, an image representing virtual key information superimposed on the input portion such that each one of a plurality of virtual input keys is mapped to be displayed in conjunction with a respective one of a plurality of input positions of the input portion each corresponding to a unique key input, wherein the mapping of the superimposed displaying of the virtual input keys upon the plurality of input positions is not visible to other persons who are not a current user of the input portion.

14. A tangibly embodied non-transitory computer-readable storage medium storing instructions which, when executed by a processor, cause a computer to perform a method, comprising:

transmitting virtual key information defining a layout of virtual input keys;

determining input position information based on a detected input member; and determining a key input by comparing the virtual key information with the input position information, wherein the virtual key information defines a layout of virtual input keys to be superimposed on an input unit such that each one of the virtual input keys is mapped to be displayed in conjunction with a respective one of a plurality of input positions of the input unit each corresponding to a unique key input, wherein the mapping of the superimposed displaying of the virtual input keys upon the plurality of input positions is not visible to other persons who are not a current user of the input unit, and wherein the input unit comprises one of an unlabeled keyboard, or a touch panel display which does not display identifying characters.

15. A tangibly embodied non-transitory computer-readable storage medium storing instructions which, when executed by a processor, cause a computer to perform a method, comprising:

receiving image data representing an input image;

recognizing an input portion in the image data based on features of the input portion; and displaying, via a head-mounted display, an image representing virtual key information superimposed on the input portion such that each one of a plurality of virtual input keys is mapped to be displayed in conjunction with a respective one of a plurality of input positions of the input portion each corresponding to a unique key input, and wherein the mapping of the superimposed displaying of the virtual input keys upon the plurality of input positions is not visible to other persons who are not a current user of the input portion.

16. A system comprising:

an input apparatus comprising:

a communication unit configured to transmit virtual key information;

an input unit configured to determine input position information based on a detected input member; and a determination unit configured to determine a key input by comparing the virtual key information with the input position information, wherein the input unit comprises one of an unlabeled keyboard, or a touch panel display which does not display identifying characters, and wherein the communication unit, the input unit, and the determination unit are each implemented via at least one processor of the input apparatus; and a terminal apparatus comprising:

an imaging unit configured to receive image data representing an input image;

a recognition unit configured to recognize an input portion in the image data based on features of the input portion;

a display control unit configured to display an image representing virtual key information superimposed on the input portion; and a head-mounted display via which the image representing virtual key information is displayed to be superimposed on the input portion, wherein the imaging unit, the recognition unit, and the display control unit are each implemented via at least one processor of the terminal apparatus, wherein the virtual key information defines a layout of virtual input keys to be superimposed on the input portion such that each one of the virtual input keys is mapped to be displayed in conjunction with a respective one of a plurality of input positions of the input portion each corresponding to a unique key input, and wherein the mapping of the superimposed displaying of the virtual input keys upon the plurality of input positions is not visible to other persons who are not a current user of the input apparatus or the terminal apparatus.

17. A system comprising:

an input apparatus comprising:

communication means for transmitting virtual key information;

input means for determining input position information based on a detected input member; and determination means for determining a key input by comparing the virtual key information with the input position information, wherein the input means comprises one of an unlabeled keyboard, or a touch panel display which does not display identifying characters; and a terminal apparatus comprising:

imaging means for receiving image data representing an input image;

recognition means for recognizing an input portion in the image data based on features of the input portion;

display control means for displaying an image representing virtual key information superimposed on the input portion; and a head-mounted display means via which the image representing virtual key information is displayed to be superimposed on the input portion;

wherein the virtual key information defines a layout of virtual input keys to be superimposed on the input portion such that each one of the virtual input keys is mapped to be displayed in conjunction with a respective one of a plurality of input positions of the input portion each corresponding to a unique key input, and wherein the mapping of the superimposed displaying of the virtual input keys upon the plurality of input positions is not visible to other persons who are not a current user of the input apparatus or the terminal apparatus.

18. The apparatus of claim 1, wherein the plurality of input positions of the input unit are each configured to actively detect for a touching or pressing by the detected input member.

19. The apparatus of claim 1, wherein the input unit senses inputs made at a plurality of input positions thereupon by the input member.

20. The terminal apparatus of claim 8, wherein the displayed image is hidden from the other persons.

21. The terminal apparatus of claim 8, wherein a mapping relationship between the plurality of virtual input keys and the plurality of input positions of the input portion upon which the image is superimposed is only discernable from a perspective of a current user of the terminal apparatus and is hidden from other persons.

\* \* \* \* \*